United States Patent
Watabe et al.

(10) Patent No.: US 11,746,171 B2
(45) Date of Patent: Sep. 5, 2023

(54) METHOD FOR FRACTIONATING LIQUID COMPOSITION

(71) Applicant: AGC Inc., Tokyo (JP)

(72) Inventors: Hiroyuki Watabe, Chiyoda-ku (JP); Mitsuhisa Matsumoto, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 591 days.

(21) Appl. No.: 17/034,149

(22) Filed: Sep. 28, 2020

(65) Prior Publication Data

US 2021/0009733 A1 Jan. 14, 2021

Related U.S. Application Data

(63) Continuation of application No. PCT/JP2019/015672, filed on Apr. 10, 2019.

(30) Foreign Application Priority Data

Apr. 12, 2018 (JP) .................. 2018-076951

(51) Int. Cl.
   *C08F 216/14* (2006.01)
   *B01D 35/02* (2006.01)
   *B01J 4/02* (2006.01)
   *B01J 4/00* (2006.01)
   *B67C 3/22* (2006.01)

(52) U.S. Cl.
   CPC ........ *C08F 216/1416* (2013.01); *B01D 35/02* (2013.01); *B01J 4/002* (2013.01); *B01J 4/02* (2013.01); *B67C 3/22* (2013.01); *C08F 2800/10* (2013.01)

(58) Field of Classification Search
   CPC ............ B05D 1/26–265; B01J 4/00–04; B01J 2204/00–007; B67D 3/00–048
   See application file for complete search history.

(56) References Cited

U.S. PATENT DOCUMENTS

| 2017/0288249 | A1* | 10/2017 | Hommura | H01M 8/1018 |
| 2018/0079872 | A1* | 3/2018 | Watabe | H01M 4/926 |
| 2018/0131026 | A1* | 5/2018 | Watabe | C08J 3/02 |
| 2018/0186913 | A1* | 7/2018 | Watabe | H01M 4/8668 |

FOREIGN PATENT DOCUMENTS

| WO | WO-2016178871 A1 * | 11/2016 | ............ C08F 220/18 |
| WO | WO 2017/006841 A1 | 1/2017 | |

OTHER PUBLICATIONS

International Search Report dated May 14, 2019 in PCT/JP2019/015672 filed Apr. 10, 2019, citing documents AA and AO therein, 2 pages.

* cited by examiner

*Primary Examiner* — Stephen E Rieth
(74) *Attorney, Agent, or Firm* — Element IP, PLC

(57) ABSTRACT

To provide a method for fractionating a liquid composition, which is excellent in separability of the liquid composition. This method for fractionating a liquid composition comprises discharging, from a discharge port of a filling nozzle, a liquid composition containing a solvent and a polymer having ion exchange groups, and fractionating a predetermined amount of the liquid composition, characterized in that the temperature of the liquid composition is controlled so that the average tan δ1 of the liquid composition when discharged from the discharge port of the filling nozzle becomes to be at most 1.00.

14 Claims, 2 Drawing Sheets

METHOD FOR FRACTIONATING LIQUID COMPOSITION

TECHNICAL FIELD

The present invention relates to a method for fractionating a liquid composition, which is excellent in separability.

BACKGROUND ART

A polymer having ion exchange groups is applied to various applications such as ion exchange membranes and solid polymer electrolyte membranes.

At the time of handling the polymer, it is used in the form of a liquid composition containing the polymer and a solvent in many cases (Patent Document 1).

PRIOR ART DOCUMENT

Patent Document

Patent Document 1: WO2017/006841

DISCLOSURE OF INVENTION

Technical Problem

At the time of producing various members by using a liquid composition containing a polymer having ion exchange groups, there may be a case where the liquid composition is used by fractionating it in a predetermined amount.

On the other hand, in a case where it is tried to fractionate a predetermined amount of the liquid composition by discharging the liquid composition from a discharge port of a nozzle, at the time when the discharge of the liquid composition from the nozzle is stopped, there has been a case where separability of the liquid composition is poor, and liquid dripping of the liquid composition occurs at the tip of the nozzle. The occurrence of such liquid dripping affects the measurement of the liquid composition.

An object of the present invention is to provide a method for fractionating a liquid composition, which is excellent in separability of the liquid composition in a case of fractionating a predetermined amount of the liquid composition by discharging it from a discharge port of a nozzle.

Solution to Problem

As a result of intensive studies to achieve the above object, the present inventors have found it possible to solve the above problem by the invention having the following embodiments.

(1) A method for fractionating a liquid composition, which comprises discharging a liquid composition containing a polymer having ion exchange groups and a solvent, from a discharge port of a filling nozzle, and fractionating a predetermined amount of the liquid composition, characterized in that the temperature of the liquid composition is controlled so that the later-described average tan δ1 of the liquid composition when discharged from the discharge port becomes to be at most 1.00.

(2) The method for fractionating a liquid composition according to (1), wherein the liquid composition is supplied from a reservoir of the liquid composition to the filling nozzle via a transfer channel, and the temperature of the liquid composition is controlled so that the later-described average tan δ2 of the liquid composition becomes to exceed 1.00 in a region of at least a part in the transfer channel.

(3) The fractionation method according to (1) or (2), wherein the filling nozzle has a closing mechanism that can close and open the discharge port by moving a forward and backward movable pressing member, and at the time when the pressing member closes the discharge port, the distance between the abutting portion of the pressing member with the filling nozzle inner wall and the tip portion of the filling nozzle is at most 5 mm.

(4) The fractionation method according to (2) or (3), wherein a filter is disposed in the transfer channel portion, and
the temperature of the liquid composition is controlled so that the average tan δ2 of the liquid composition becomes to exceed 1.00 from the reservoir to at least the downstream of the filter.

(5) The fractionation method according to any one of (1) to (4), wherein the temperature of the liquid composition at the time when discharged from the discharge port of the filling nozzle is controlled to be from 40 to 75° C.

(6) The fractionation method according to any one of (1) to (5), wherein the liquid composition is supplied from the reservoir of the liquid composition to the filling nozzle via the transfer channel, and the temperature of the liquid composition in a region of at least a part in the transfer channel is controlled to be more than 75° C. and at most 100° C.

(7) The fractionation method according to any one of (1) to (6), wherein the average tan δ1 of the liquid composition is from 0.20 to 0.90.

(8) The fractionation method according to any one of (1) to (7), wherein the average tan δ2 of the liquid composition is from 1.01 to 10.00.

(9) The fractionation method according to any one of (1) to (8), wherein the polymer having ion exchange groups is a perfluoropolymer having ion exchange groups.

(10) The fractionation method according to (9), wherein the perfluoropolymer having ion exchange groups is a polymer (F) which is a polymer having units (A) based on a perfluoromonomer having a group capable of being converted to an ion exchange group, and units (B) based on a perfluoromonoene monomer having a 5-membered ring, or a perfluorodiene monomer capable of forming a 5-membered ring by cyclopolymerization, in which the group capable of being converted to an ion exchange group has been converted to an ion exchange group.

(11) The fractionation method according to (10), wherein units (A) are units based on a perfluoromonomer having a precursor group represented by the following formula (g1):

($Q^1$ is a perfluoroalkylene group which may have an etheric oxygen atom, $Q^2$ is a single bond or a perfluoroalkylene group which may have an etheric oxygen atom, and Y is a fluorine atom or a monovalent perfluoro organic group.)

(12) The fractionation method according to (10) or (11), wherein the content of units (A) in the polymer (F) is from 8 to 19 mol %, to all units of the polymer (F).

(13) The fractionation method according to any one of (1) to (12), wherein the content of a perfluoropolymer having ion exchange groups contained in the liquid composition is from 10 to 26 mass %.

(14) The fractionation method according to any one of (1) to (13), wherein the solvent contained in the liquid composition contains one or both of water and an organic solvent, and in the case of containing both, the proportion of water is from 1 to 60 mass %.

Advantageous Effects of Invention

According to the present invention, it is possible to provide a method for fractionating a liquid composition, which is excellent in separability of the liquid composition and which is capable of suppressing liquid dripping that occurs due to poor separability and affects the measurement of the liquid composition, at the time when discharge of the liquid composition from the nozzle has been stopped, in a case where a predetermined amount of the liquid composition is fractionated by discharging the liquid composition from the discharge port of the nozzle.

DESCRIPTION OF EMBODIMENTS

Figure 1:
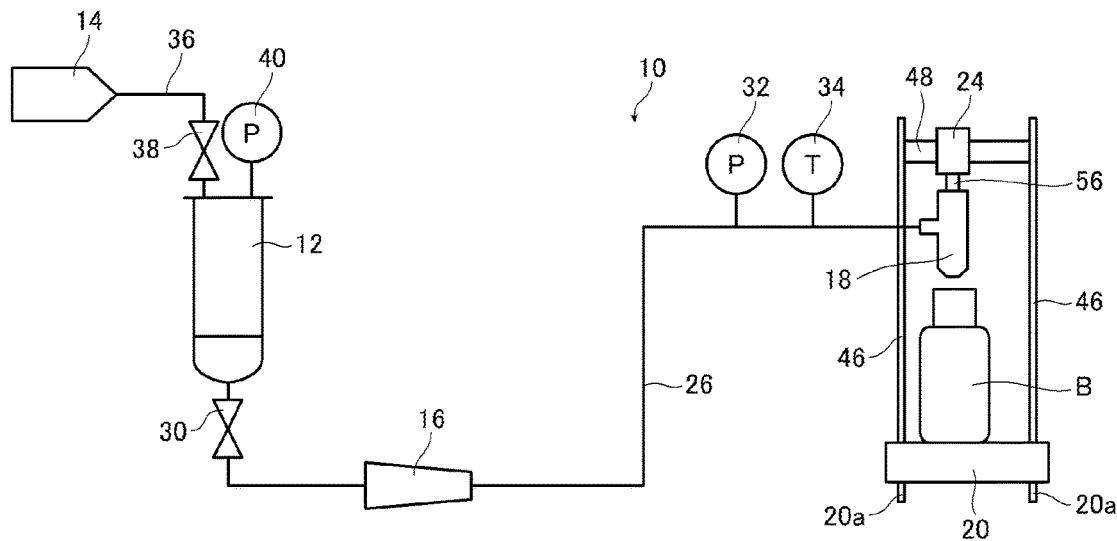
FIG. 1 is a diagram conceptually showing an example of a fractionating apparatus for carrying out the fractionation method of the present invention.

In the present specification and claims, the definitions and descriptions of the following terms are as follows unless otherwise specified. They are applied throughout the specification and claims.

A unit represented by the formula (u1) may be referred to as a unit (u1). The same applies to units represented by other formulas.

A compound represented by the formula (m1) may be referred to as a compound (m1). The same applies to compounds represented by other formulas. Further, in a case where the compound (m1) is a monomer, a unit based on the compound (m1) may be referred to as a unit (m1). The same applies to other monomers.

A group represented by the formula (g1) may be referred to as a group (g1). The same applies to groups represented by other formulas.

An "ion exchange group" is a group capable of exchanging at least part of ions contained in this group with another ion, and may, for example, be the following sulfonic acid type functional group or carboxylic acid type functional group.

A "sulfonic acid type functional group" means a sulfonic acid group ($-SO_3H$) or a sulfonate group ($-SO_3M^2$, where $M^2$ is an alkali metal or a quaternary ammonium cation).

A "carboxylic acid type functional group" means a carboxylic acid group ($-COOH$) or a carboxylate group ($-COOM^1$, where $M^1$ is an alkali metal or a quaternary ammonium cation).

A "precursor group" means a group that can be converted to an ion exchange group by treatment such as hydrolysis treatment or acid type treatment, and may, for example, be a group that can be converted to a sulfonic acid type functional group or to a carboxylic acid type functional group.

A "group that can be converted to a sulfonic acid type functional group" means a group capable of being converted to a sulfonic acid type functional group by treatment such as hydrolysis treatment or acid type treatment.

A "group that can be converted to a carboxylic acid type functional group" means a group capable of being converted to a carboxylic acid type functional group by treatment such as hydrolysis treatment or acid type treatment.

A "unit" in a polymer means an atomic group derived from one molecule of a monomer, which is formed by polymerization of the monomer. The unit may be an atomic group directly formed by a polymerization reaction, or an atomic group in which part of the atomic group is converted to another structure by treating the polymer obtained by the polymerization reaction.

A numerical range represented by "to" means a range including the numerical values described before and after "to" as the lower limit value and the upper limit value.

The fractionation method of the present invention is a method for fractionating a liquid composition, which comprises discharging a liquid composition containing a polymer having ion exchange groups and a solvent from a discharge port of a filling nozzle, and fractionating a predetermined amount of the liquid composition, characterized in that the temperature of the liquid composition is controlled so that the average tan δ1 as described later of the liquid composition when discharged from the discharge port of the filling nozzle becomes to be at most 1.00.

In the above method, when the average tan δ1 of the liquid composition discharged from the discharge port of the filling nozzle is adjusted to be at most 1.00, the liquid composition will exhibit so-called elastic characteristics, and at the time when the filling nozzle is closed, liquid dripping will be less likely to occur at the tip of the filling nozzle, and the liquid composition will be excellent in separability.

Further, the liquid composition is supplied from a reservoir to the filling nozzle via a transfer channel, and in a region of at least a part in the transfer channel (in other words, at least a part of the region between the reservoir and the filling nozzle), if the average tan δ2 of the liquid composition is adjusted to exceed 1.00, the liquid composition will exhibit so-called viscous characteristics in the above region, and transportation of the liquid composition from the reservoir to the filling nozzle will be efficiently proceeded.

In the following, first, an example of the fractionating apparatus to be used in the fractionation method of the present invention and the fractionation method using the apparatus will be described in detail. The composition of the liquid composition to be used will be shown later as summarized.

The fractionating apparatus 10 illustrated in FIG. 1 is an apparatus that transports a liquid composition stored in a storage tank 12 and fills it into a bottle B. That is, the fractionating apparatus 10 is an apparatus that fractionates the liquid composition stored in the storage tank 12 into the bottle B.

The fractionating apparatus 10 has a pressure source 14, a filter 16, a filling nozzle 18, a weighing table 20, an elevating means 24, and a transport pipe 26, in addition to the storage tank 12 as described above.

The storage tank 12, the filter 16 and the filling nozzle 18 are connected by a transport pipe 26 in the order of the storage tank 12, the filter 16 and the filling nozzle 18 from the upstream side in the transport direction of the liquid composition. In the following description, the terms "upstream" and "downstream" refer to upstream and downstream in the transport direction of the liquid composition.

Below the filling nozzle 18, a weighing table 20 for measuring the mass is disposed, and on the weighing table 20, a bottle B to be filled with the liquid composition is to be mounted.

A valve 30 is provided in the transport pipe 26 between the storage tank 12 and the filter 16. Further, a pressure gauge 32 and a thermometer 34 are provided on the transport pipe 26 between the filter 16 and the filling nozzle 18. The valve, the pressure gauge, and the thermometer may be provided at various positions other than the positions shown in the drawing, as the case requires. The transport pipe 26 corresponds to a transfer channel for transferring the liquid composition.

Although illustration is omitted, on one or more of the storage tank 12, the filter 16, the filling nozzle 18, and the transport pipe 26, a temperature adjusting means is provided for controlling the temperature of the liquid composition to be transported and fractionated. In a case where the temperature adjusting means is provided in the transport pipe 26, the temperature adjusting means may be provided in the entire area of the transport pipe 26 in the transport direction of the liquid composition, or partly at a part or a plurality of locations. In the illustrated example, as a preferred mode, temperature adjusting means are provided on the storage tank 12, the filter 16, the filling nozzle 18, and the transport pipe 26 (entire area).

Specific examples of the temperature adjusting means include a heater (for example, a ribbon heater or a jacket heater), a hot air or cold air supplying means, and a temperature adjusting medium supplying means between the jacket and the double tube.

Further, at least a part of one or more of the storage tank 12, the filter 16, the filling nozzle 18, and the transport pipe 26, may be covered with a heat insulating material, as the case requires.

The storage tank 12 is a tank (reservoir) that stores the liquid composition to be filled into the bottle B, and is a reservoir of the liquid composition in the fractionation method of the present invention. Further, in the storage tank 12, a stirring means may be provided for stirring the liquid composition to be stored, as the case requires.

In the fractionation method of the present invention, the reservoir of the liquid composition is not limited to a storage tank for storing the liquid composition, and may be, for example, a preparation device for preparing the liquid composition.

To the storage tank 12, a pressure source 14 is connected by a pressure pipe 36. Further, the pressure pipe 36 is provided with a valve 38. In the storage tank 12, a pressure gauge 40 is provided, and the pressure inside the storage tank 12 is measured.

An inert gas such as nitrogen or argon is supplied from the pressure source 14 to the storage tank 12 to pressurize the storage tank 12, the liquid composition is discharged from the storage tank 12 to the transport pipe 26, and the liquid composition is transported to the filling nozzle 18 and filled into the bottle B.

For the pressurization by the pressure source 14 (that is, the pressure in the storage tank 12), a pressure at which the liquid composition can be properly discharged from the storage tank 12, may suitably be set depending on e.g. the viscosity of the liquid composition to be stored in the storage tank 12.

As specific examples of the pressure source 14, gas supply means (pressurization means by gas) such as a gas cylinder, a compressor, a pump, etc. may be exemplified.

As the gas to be supplied by the pressurizing source 14, air may be used instead of the inert gas, but the inert gas is preferred from the viewpoint of safety and prevention of deterioration of the liquid composition.

In the fractionation method of the present invention, the method of supplying the liquid composition from the storage tank 12 is not limited to pressurization by supplying gas.

That is, in the fractionation method of the present invention, for the supply of the liquid composition from the storage tank 12, it is possible to utilize a method such as a method of using a pump, a method of depressurizing from the filling nozzle side (suction), a method of utilizing gravity, or a method of mechanically extruding it (using a liquid surface pressure on a flat plate or an extruder).

Further, including pressurization by gas, by using a plurality of these in combination, the supply of the liquid composition from the storage tank 12 may be conducted.

The liquid composition supplied from the storage tank 12 will then pass through the filter 16. The liquid composition is filtered by the filter 16 to remove foreign substances mixed in the liquid composition. In the fractionation method of the present invention, the filter 16 is provided as a preferred mode.

As specific examples of the filter 16, filters capable of filtering the liquid composition, such as a non-woven fabric, a mesh, a porous body, etc., may be mentioned.

Further, the mesh size of the filter 16 (size of foreign matters to be removed) may suitably be set depending on e.g. the quality required for the liquid composition to be filled into the bottle B, the viscosity of the liquid composition, the size of foreign matters expected to be mixed, etc.

The liquid composition that has passed through the filter 16, is transported in the transport pipe 26 and supplied to the filling nozzle 18. As described above, the weighing table 20 is located below the filling nozzle 18, and the bottle B is mounted at the position corresponding to the filling nozzle 18, on the weighing table 20, and the liquid composition discharged from the filling nozzle 18 is filled into the bottle B.

Further, during the transportation of the liquid composition, between the filter 16 and the filling nozzle 18, the pressure inside the transport pipe 26 is measured by the pressure gauge 32 and the temperature of the liquid composition is measured by the thermometer 34.

In the fractionating apparatus 10 of the illustrated example, support columns 46 are erected outside the weighing section of the weighing table 20, and an elevating means 24 is fixed to a beam 48 that engages with the support columns 46. A shaft member 56 (engagement portion 56c) of the filling nozzle 18, which will be described later, is engaged with the elevating means 24.

Although not shown, the filling nozzle 18 is also fixed to the support columns 46 by a method of using a beam, a jig and a bracket, etc. Further, reference numeral 20a in the drawing is a leg portion that supports the weighing table 20.

Figure 2A:
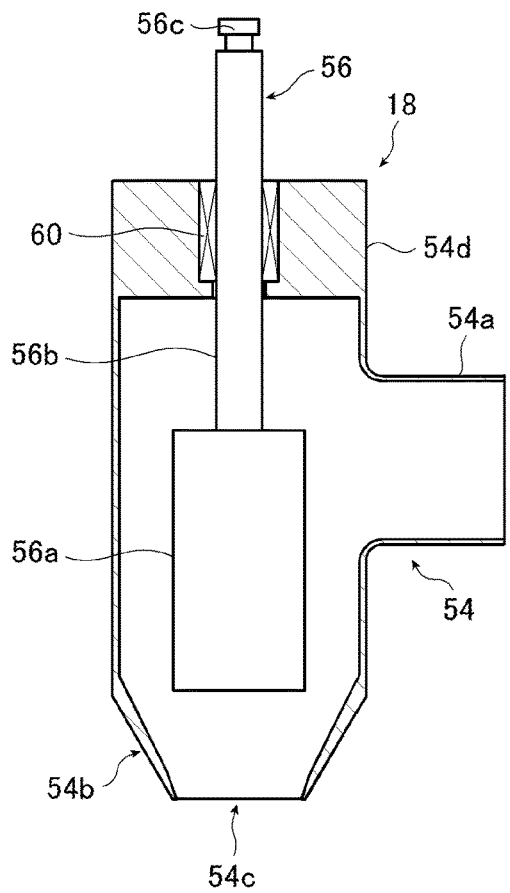
FIGS. 2(A) and 2(B) are partial cross-sectional views conceptually showing a filling nozzle in the fractionating apparatus shown in FIG. 1.
Figure 2B:
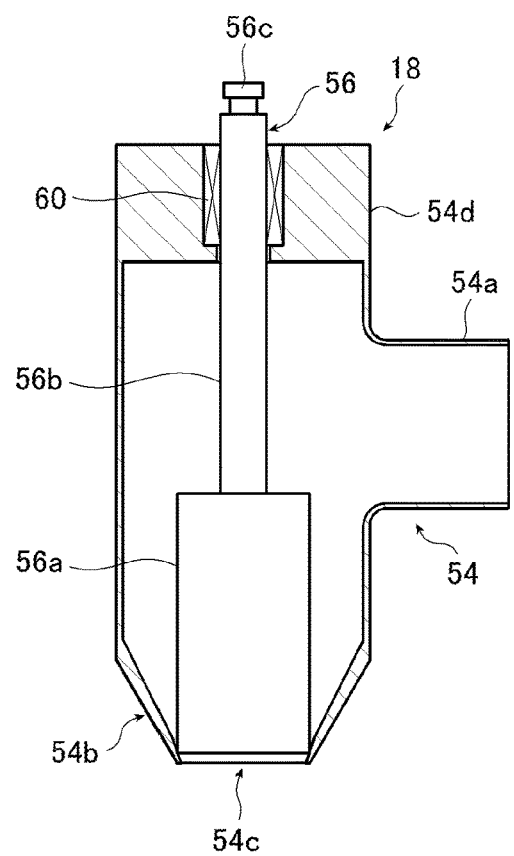

FIG. 2 show partial cross-sectional views of the filling nozzle 18. Here, FIG. 2A shows a state in which the filling nozzle 18 is opened, that is, a state in which the liquid composition is being filled (supplied) into the bottle B, and FIG. 2B shows a state in which the filling nozzle 18 is closed.

As conceptually shown in FIG. 2, the filling nozzle 18 has a nozzle body 54 and a shaft member 56. Here, in the filling nozzle 18 of the illustrated example, the nozzle body 54 and the shaft member 56 are each constituted by one member, but the nozzle body 54 and/or the shaft member 56 may be formed by combining a plurality of members, or may be constituted so as to be disassembled for cleaning or the like.

Here, the shaft member 56 corresponds to a pressing member movable back and forth.

The nozzle body 54 is a substantially cylindrical member, and is provided with an inflow port 54a that projects from the side surface of the cylinder and communicates with an internal through hole. To this inflow port 54a, the above-described transport pipe 26 is connected, and the liquid composition is supplied to the filling nozzle 18.

The lower portion of the nozzle body 54 is a hollow conical nozzle portion 54b whose diameter gradually decreases toward the lower side, and the nozzle portion 54b (that is, the lower end of the nozzle body 54) constitutes a discharge port 54c to discharge the liquid composition.

Further, the upper portion of the nozzle body 54 constitutes a substantially cylindrical holding portion 54d having a large wall thickness and a small hole diameter. To the inner surface of the holding portion 54d, a packing 60 is fixed.

The shaft member 56 is a rod-shaped member that is a combination of two cylinders having different thicknesses, and has a large diameter portion 56a on the lower side and a small diameter portion 56b on the upper side. Further, at the upper end, a step is provided to form an engaging portion 56c that engages with the elevating means 24 as described later.

The upper small diameter portion 56b of the shaft member 56 is inserted into the holding portion 54d (that is, the packing 60) of the nozzle body 54 and held by the nozzle body 54. The packing 60 supports the small diameter portion 56b of the shaft member 56 so as to be airtight and movable in the longitudinal direction. That is, the packing 60 is a slide bearing (linear motion bearing) that supports the shaft member 56 in an airtight and linearly reciprocable manner.

The shaft member 56 is a columnar member, and the large diameter portion 56a on the lower side is a columnar shape having a slightly larger diameter than the discharge port 54c of the nozzle body 54. Further, as described above, the nozzle body 54 is a cylindrical member, and the lower nozzle portion 54b has a conical shape whose diameter decreases downward.

Further, the shaft member 56 and the nozzle portion 54b (nozzle body 54) are arranged with their center lines aligned (or substantially aligned) with each other.

Therefore, from the state as shown in FIG. 2A where the shaft member 56 is raised, and the nozzle portion 54b of the nozzle body 54 and the large diameter portion 56a of the shaft member 56 are separated from each other, the shaft member 56 is moved downward by the elevating means 24, so that, as shown in FIG. 2B, the inner surface of the nozzle portion 54b and the lower end portion of the large diameter portion 56a are brought into contact with each other, whereby it is possible to close the nozzle portion 54b. That is, the entire tip of the lower end of the cylindrical large-diameter portion 56a can be brought into contact with the inner surface of the conical nozzle portion 54b to close the filling nozzle 18. That is, the filling nozzle 18 has a closing mechanism that can close and open the discharge port 54c by moving the shaft member 56.

In the filling nozzle 18, the nozzle body 54 and the shaft member 56 are made of metal such as stainless steel.

At that time, in order to prevent damage to the nozzle body 54 and the shaft member 56 and to enhance liquid tightness, a packing made of a resin material such as polytetrafluoroethylene may be provided at the lower end of the shaft member 56, so that the packing and the nozzle portion 54b may abut to close the filling nozzle 18.

In the filling nozzle 18 of the illustrated example, the conical nozzle portion 54b is closed by the cylindrical shaft member 56, but the present invention is not limited to this.

For example, the nozzle portion of the nozzle body may be made to have a pyramid shape such as a triangular pyramid, a quadrangular pyramid or a hexagonal pyramid, and it may be made so that by the corresponding prismatic shaft member, the nozzle portion (filling nozzle) may be closed and opened. Alternatively, the shaft member may be retained to be a cylinder, and the nozzle portion may be made to be spherical.

Further, the shaft member 56 may not be limited to a columnar shape, and the lower end portion may have a conical shape, a pyramid shape, or the like, or the lower end portion may have a curved surface-shaped cylinder such as a spherical shape.

The elevating means 24 elevates and lowers the shaft member 56 of the filling nozzle 18 to open and close the filling nozzle 18.

As the elevating means 24, it is possible to use a linear moving means that reciprocates a rod-shaped member in the longitudinal direction. Specific examples of the elevating means 24 may be a hydraulic cylinder, an air cylinder, a moving means using a cam, and a moving means using a link.

Here, the filling nozzle 18 in the illustrated example has a so-called shut-off nozzle (shut-off valve, shut-nozzle) construction in which opening and closing are carried out by bringing a rod-shaped member into contact with a nozzle portion whose diameter is gradually reduced, but in the present invention, the filling nozzle is not limited to this.

In the present invention, as the filling nozzle, for example, various constructions can be used, in which various valves (valves) are provided with a liquid composition discharge port (discharge nozzle). Specific examples of the valve may be a gate valve (shutter valve), a ball valve, and a butterfly valve. Here, in these filling nozzles, opening and closing of the valve may be conducted by a method according to the type of the valve.

In the fractionation method of the present invention, the filling nozzle preferably has a short distance between the discharge port (lower end portion) for discharging the liquid composition and the closed position of the nozzle.

Figure 3:
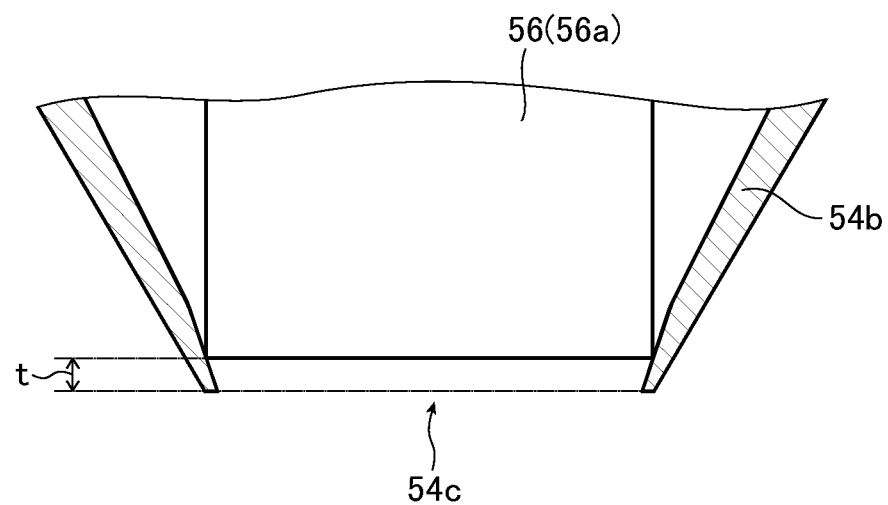
FIG. 3 is an enlarged cross-sectional view conceptually showing a part of the filling nozzle.

In the filling nozzle 18 shown in FIG. 3, it is preferred that the distance t between the discharge port 54c and the closed portion where the lower end portion of the shaft member 56 (large diameter portion 56a) contacts the nozzle portion 54b, is short. That is, it is preferred that the distance t between the contact portion of the shaft member 56 with the inner wall of the filling nozzle 18 and the tip of the filling nozzle when the shaft member 56 closes the discharge port 54c of the filling nozzle 18, is short. Specifically, the distance t between the discharge port 54c and the closed portion is preferably at most 5 mm, more preferably at most 3 mm. The lower limit of the distance t may be 0 mm.

Note that this point is the same for any filling nozzles.

When the distance t between the discharge port 54c and the closed portion is set to be at most 5 mm (particularly at most 3 mm), even if the viscosity of the liquid composition is high, it is possible to substantially reduce the amount (amount of liquid dripping) of the liquid composition that remains in the discharge port 54c when the filling nozzle 18 is closed, and it is possible to fill (fractionate) the desired amount of the liquid composition into the bottle B stably.

As described above, the bottle B is mounted on the weighing table 20 so as to be located below the filling nozzle 18 (that is, the discharge port 54c). The weighing table 20 is a known mass measuring device.

Hereinafter, the operation of the fractionating apparatus 10 will be described.

At the time of filling the liquid composition into the bottle B by the fractionating apparatus 10, first, the bottle B to be filled with the liquid composition is mounted at a predetermined position on the weighing table 20 below the filling nozzle 18.

Next, as shown in FIG. 2A, the shaft member 56 is moved upward by the elevating means 24 to open the filling nozzle 18. Further, the valves 30 and 38 are opened, and nitrogen gas or the like is supplied from the pressure source 14 to the storage tank 12 to pressurize the inside of the storage tank 12.

As a result, the liquid composition stored in the storage tank 12 is discharged from the storage tank 12, transported by the transport pipe 26, filtered by the filter 16, further transported by the transport pipe 26, and supplied to the filling nozzle 18.

The liquid composition supplied to the filling nozzle 18 flows into the filling nozzle 18 (inside the nozzle body 54) from the inflow port 54a, descends in the nozzle body 54, is discharged from the discharge port 54c via the nozzle portion 54b, and filled into the bottle B.

Further, in the fractionation method of the present invention, at the time of filling the liquid composition into the bottle B by the fractionating apparatus 10, the temperature of the liquid composition to be filled into the bottle B is controlled by driving the temperature adjusting means provided in the storage tank 12, the filter 16, the filling nozzle 18 and the transport pipe 26.

Specifically, the temperatures of the liquid composition in e.g. the storage tank 12 and the filling nozzle 18 are controlled so that the average tan δ2 of the liquid composition in the storage tank 12, the filter 16, and at least the transport pipe 26 immediately downstream of the filter 16, becomes to exceed 1.00, and the average tan δ1 of the liquid composition discharged from the discharge port 54c of the filling nozzle 18 becomes to be at most 1.00.

The above average tan δ2 means an arithmetic mean value of the loss tangent tan δ (10 Hz) at a frequency of 10 Hz and the loss tangent tan δ (20 Hz) at a frequency of 20 Hz obtainable by dynamic viscoelasticity measurement conducted by changing the frequency from 1 Hz to 100 Hz under conditions of a strain of 1% and a temperature of T2 using the liquid composition, at the time when the temperature of the liquid composition in the storage tank 12, the filter 16 and at least the transport pipe 26 immediately downstream of the filter 16, is T2. Further, the method of calculating the average tan δ2 will be described in detail in the section of Examples as described later.

Further, the above average tan δ1 means an arithmetic mean value of the loss tangent tan δ (10 Hz) at a frequency of 10 Hz and the loss tangent tan δ (20 Hz) at a frequency of 20 Hz, obtainable by dynamic viscoelasticity measurement conducted by changing the frequency from 1 Hz to 100 Hz under conditions of a strain of 1% and a temperature of T1 using the liquid composition, at the time when the temperature of the liquid composition discharged from the discharge port 54c of the filling nozzle 18, is T1. Further, the method of calculating the average tan δ1 will also be described in detail in the section of Examples as described later.

It should be noted that the viscoelastic characteristics generally show velocity dependence. Therefore, in order to carry out the measurement in the frequency regions corresponding to the regions of the velocity at which the liquid composition is generally deformable, a frequency of 10 Hz and a frequency of 20 Hz are selected for calculating the average tan δ1 and the average tan δ2.

As described above, the liquid composition having an average tan δ2 exceeding 1.00 tends to exhibit so-called viscous characteristics. Therefore, if the liquid composition has such viscous characteristics, the transportation of the liquid composition from the storage tank 12 to the filling nozzle 18 proceeds efficiently.

Here, the value of the average tan δ2 may be more than 1.00, and is preferably from 1.01 to 10.00, more preferably from 1.10 to 5.00.

Further, the liquid composition having an average tan δ1 of at most 1.00 tends to exhibit so-called elastic characteristics. Therefore, if the liquid composition exhibits such elastic characteristics, the liquid separating property becomes good when the filling nozzle 18 is closed.

Here, the value of the average tan δ1 may be at most 1.00, and is preferably from 0.20 to 0.90, more preferably from 0.50 to 0.80.

Further, in the above description, a mode of adjusting both average tan δ1 and average tan δ2 has been described, but, in order to achieve the effects of the present invention, the temperature of the liquid composition may be controlled so that the average tan δ1 will fall within the predetermined range.

Further, in the above description, a mode in which the temperatures of the liquid composition in the storage tank 12, the filter 16, and at least the transport pipe 26 immediately downstream of the filter 16 are all controlled to be T2, but, it is sufficient that the average tan δ2 of the liquid composition in at least a part of the region from the reservoir to the filling nozzle exceeds 1.00. In other words, at the time of supplying the liquid composition from the reservoir to the filling nozzle via the transfer channel, it is sufficient that the average tan δ2 of the liquid composition in at least a part of the region in the transfer channel exceeds 1.00.

However, in a case where as in the fractionating apparatus 10 of the illustrated example, a member that causes a pressure loss, such as the filter 16, is disposed in the middle of the transport pipe 26 from the storage tank 12 to the filling nozzle 18 and in a case where there is a position where a pressure loss occurs due to the path of the transport pipe 26, it is preferred to control the temperature of the liquid composition so that the average tan δ2 of the liquid composition becomes to exceed 1.00 at least up to the member that causes the pressure loss and to immediately downstream of the position where the pressure loss occurs. Particularly, it is more preferred to control the temperature of the liquid composition so that the average tan δ2 of the liquid composition becomes to exceed 1.00 at least from the reservoir to the downstream of the filter.

The temperature of the liquid composition in the storage tank 12, the filter 16 and at least the transport pipe 26 immediately downstream of the filter 16 is adjusted so that the liquid composition exhibits the above-mentioned average tan δ2, and specifically, it preferably exceeds 75° C., more preferably exceeds 80° C. As the upper limit, 100° C. may be mentioned from the viewpoint of volatilization of the solvent.

Further, the temperature of the liquid composition discharged from the discharge port 54c of the filling nozzle 18 is adjusted so that the liquid composition exhibits the above-mentioned average tan δ1, and specifically, it is preferably at most 75° C., more preferably at most 70° C. As the lower limit, 40° C. may be mentioned.

During filling of the liquid composition into the bottle B, the pressures are measured by the pressure gauge 40 and the pressure gauge 32, and so that the pressure in the storage tank 12 and the pressure in the transport pipe 26 become to be proper, at least one of the driving of the pressure source 14, the opening of the valve 38, and the opening of the valve 30, is adjusted.

Further, during filling of the liquid composition into the bottle B, the temperature of the liquid composition in the transport pipe 26 is measured by the thermometer 34, and so that the temperature of the liquid composition becomes to be proper, the heating is adjusted by the temperature adjusting means provided in the storage tank 12 or the like.

In the fractionating apparatus 10, at the time of filling the liquid composition into the bottle B, by the weighing table 20, the mass of the bottle B, that is, the mass of the liquid composition filled in the bottle B, is measured.

When the mass of the bottle B reaches a predetermined mass, by the elevating means 24, the shaft member 56 is lowered to close the filling nozzle 18. At the same time, the valve 38 and/or the valve 30 is closed. Further, the driving of the pressure source 14 is stopped as the case requires.

When the liquid composition has dropped from the filling nozzle 18 and the filling of the liquid composition into the bottle B is completed, the next bottle B is mounted at a predetermined position on the weighing table 20 and the shaft member 56 is raised by the elevating means 24, to open the filling nozzle 18, and further, the closed valve is opened to start filling the liquid composition into the next bottle B.

As the filling amount of the liquid composition into the bottle B, an optimal amount is suitably selected according to the intended use. For example, in a case where the liquid composition is applied to the formation of the catalyst layer or the solid polymer electrolyte membrane, the filling amount into the bottle B may be from 50 to 5,000 g.

The liquid composition contains a polymer having ion exchange groups and a solvent. The liquid composition usually exhibits viscoelastic properties.

In the following, the respective components will be described in detail.

(Polymer Having Ion Exchange Groups)

Specific examples of the ion exchange group may be a sulfonic acid type functional group and a carboxylic acid type functional group, and a sulfonic acid type functional group is preferred.

As the polymer having ion exchange groups, from the viewpoint of excellent chemical durability, a fluorinated polymer is preferred, and a perfluoropolymer in which all hydrogen atoms bonded to carbon atoms are substituted by fluorine atoms, is more preferred.

As specific examples of the perfluoropolymer having ion exchange groups, the following may be mentioned. In the following, tetrafluoroethylene will be referred to as "TFE", and units based on tetrafluoroethylene will be referred to as "TFE units".

A polymer having units (m3) and TFE units, in which —SO$_2$F groups are converted to sulfonic acid groups

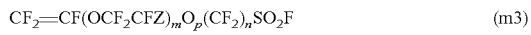

Z is a fluorine atom or a trifluoromethyl group, m is an integer of from 0 to 3, p is 0 or 1, n is from 1 to 12, and m+p>0.

A polymer having later-described units (A) and TFE units, in which precursor groups are converted to ion exchange groups (WO2007/013533).

A later-described polymer (F) in which precursor groups are converted to ion exchange groups (WO2011/013578).

As the perfluoropolymer having ion exchange groups, preferred is a later-described polymer (F) in which precursor groups are converted to ion exchange groups (hereinafter referred to also as "polymer (H)").

The polymer (F) is a polymer having units (hereinafter referred to as "units (A)") based on a perfluoromonomer having a precursor group and units (hereinafter referred to also as "units (B)") based on a perfluoromonoene monomer having a 5-membered ring or a perfluorodiene monomer capable of forming a 5-membered ring by cyclopolymerization. The polymer (F) may further have, as the case requires, units (hereinafter referred to also as "units (C)") based on another monomer.

The units (A) are units based on a perfluoromonomer having a precursor group (hereinafter referred to also as a "monomer (a)").

As the precursor group contained in a unit (A), preferred is a group that can be converted to a sulfonic acid type functional group. Specific examples of the group that can be converted to a sulfonic acid type functional group may be —SO$_2$F, —SO$_2$Cl and —SO$_2$Br.

As units (A), preferred are units based on a perfluoromonomer having a precursor group represented by the following formula (g1).

$Q^1$ is a perfluoroalkylene group which may have an etheric oxygen atom.

$Q^2$ is a single bond or a perfluoroalkylene group which may have an etheric oxygen atom.

In a case where the perfluoroalkylene group of $Q^1$ or $Q^2$ has an etheric oxygen atom, the number of oxygen atoms may be 1, or 2 or more. Further, the oxygen atom may be inserted between carbon-carbon atoms of the perfluoroalkylene group, or may be inserted at a terminal of the carbon atom bond.

The perfluoroalkylene group may be linear or branched, and is preferably linear.

The number of carbon atoms in the perfluoroalkylene group is preferably from 1 to 6, more preferably from 1 to 4.

At least one of $Q^1$ and $Q^2$ is preferably a $C_{1-6}$ perfluoroalkylene group having an etheric oxygen atom.

Y is a fluorine atom or a monovalent perfluoro organic group.

As Y, a fluorine atom or a $C_{1-6}$ linear perfluoroalkyl group which may have an etheric oxygen atom is preferred.

As the monomer (a), a compound (m1) is preferred.

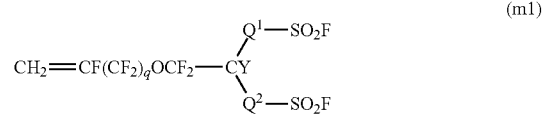

The definitions of $Q^1$, $Q^2$ and Y are as described above. q is 0 or 1.

As the compound (m1), from such a viewpoint that production of the polymer (H) will be easy and industrial implementation will be easy, compounds (m1-1) to (m1-3) are preferred, and the compound (m1-1) is more preferred.

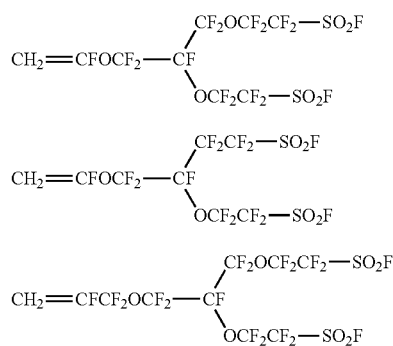

The compound (m1) can be synthesized by the method described in WO2007/013533 and JP-A-2008-202039.

Units (B) are units based on a perfluoromonoene monomer having a 5-membered ring (hereinafter referred to as a "monomer (b1)") or a perfluorodiene monomer capable of forming a 5-membered ring by cyclopolymerization (hereinafter referred to as a "monomer (b2)"), (hereinafter, the monomer (b1) and the monomer (b2) may be collectively referred to also as the monomer (b)).

The 5-membered ring is a cyclic perfluoroorganic group which may have one or two etheric oxygen atoms.

A specific example of the monomer (b1) may be the later-described perfluoro-1,3-dioxole or the later-described perfluoro-1,3-dioxolane having a difluoromethylene group or a perfluoroalkenyl group bonded to the 2-position.

A specific example of the monomer (b2) may be the later-described perfluoro(3-butenyl vinyl ether).

As specific examples of the monomer (b1), compounds (m21) to (m23) may be mentioned, and the compound (m21) or the compound (m22) is preferred. The compound (m21) is the above-mentioned perfluoro-1,3-dioxole, the compound (m22) is the above-mentioned perfluoro-1,3-dioxolane having a difluoromethylene group bonded to the 2-position, and the compound (m23) is the above-mentioned perfluoro-1,3-dioxolane having a perfluoroalkenyl group bonded thereto.

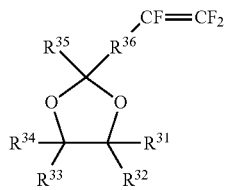

(m23)

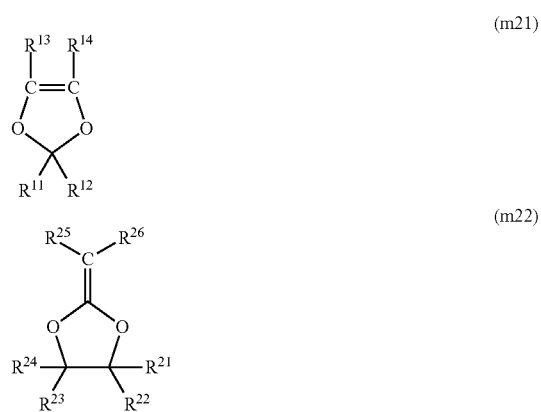

$R^{11}$ and $R^{12}$ are each independently a fluorine atom or a $C_{1-5}$ perfluoroalkyl group.

$R^{13}$ and $R^{14}$ are each independently a fluorine atom, a $C_{1-5}$ perfluoroalkyl group, or a $C_{1-5}$ perfluoroalkoxy group. From the viewpoint of high polymerization reactivity, at least one of $R^{13}$ and $R^{14}$ is preferably a fluorine atom, and more preferably, both are fluorine atoms.

The perfluoroalkyl group and the perfluoroalkoxy group may be linear or branched, and are preferably linear.

$R^{21}$ to $R^{26}$ are each independently a monovalent perfluoro organic group which may have an etheric oxygen atom, or a fluorine atom. As the monovalent perfluoro organic group, a perfluoroalkyl group is preferred. In a case where the perfluoroalkyl group has an etheric oxygen atom, the number of oxygen atoms may be one, or two or more. Further, the oxygen atom may be inserted between carbon-carbon atoms of the perfluoroalkyl group, or may be inserted at a terminal of the carbon atom bond. The perfluoroalkyl group may be linear or branched, and is preferably linear.

From the viewpoint of high polymerization reactivity, at least one of $R^{25}$ and $R^{26}$ is preferably a fluorine atom, and more preferably, both are fluorine atoms.

$R^{31}$ to $R^{35}$ are a fluorine atom, a $C_{1-6}$ perfluoroalkyl group, or a $C_{2-6}$ perfluoroalkyl group having an etheric oxygen atom between carbon-carbon atoms. In a case where the perfluoroalkyl group has an etheric oxygen atom, the number of oxygen atoms may be one, or two or more. The perfluoroalkyl group may be linear or branched, and is preferably linear.

$R^{36}$ is a single bond, a $C_{1-6}$ perfluoroalkylene group, or a $C_{2-6}$ perfluoroalkylene group having an etheric oxygen atom between carbon-carbon atoms. In a case where the perfluoroalkylene group has an etheric oxygen atom, the number of oxygen atoms may be one, or two or more. The perfluoroalkylene group may be linear or branched, and is preferably linear.

As specific examples of the compound (m21), compounds (m21-1) to (m21-8) may be mentioned, and compound (m21-1) is preferred.

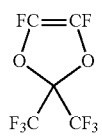

(m21-1)

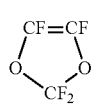

(m21-2)

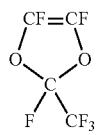

(m21-3)

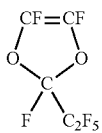
(m21-4)

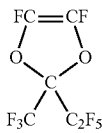
(m21-5)

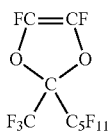
(m21-6)

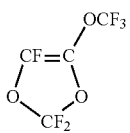
(m21-7)

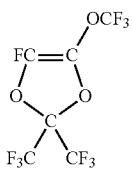
(m21-8)

As specific examples of the compound (m22), compound (m22-1) and compound (m22-2) may be mentioned, and the compound (m22-1) is preferred from the viewpoint of easy synthesis and high polymerization reactivity.

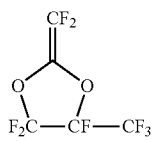
(m22-1)

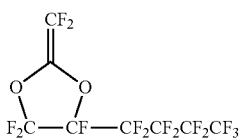
(m22-2)

As specific examples of the compound (m23), compound (m23-1) and compound (m23-2) may be mentioned.

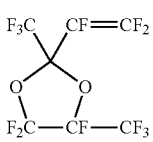
(m23-1)

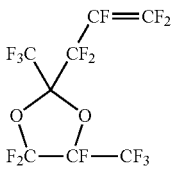
(m23-2)

The compound (m21) can be synthesized by the method described in Macromolecule, Vol. 26, No. 22, 1993, p. 5829-5834; JP-A-H6-92957.

The compound (m22) can be synthesized by the method described in WO2000/056694; Izvestiya Akademii Nauk SSSR, Seriya Khimicheskaya, 1989, Vol. 4, p. 938-42, etc.

The compound (m23) can be synthesized by the method described in JP-A-2006-241302.

Units based on the monomer (b2) are units having a 5-membered ring formed by cyclopolymerization. As a specific example of the monomer (b2), a compound (m24) may be mentioned, and units based thereon are units (u24) represented by the following formula. The compound (m24) is a perfluoro(3-butenyl vinyl ether).

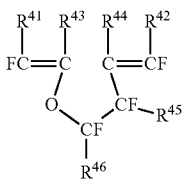
(m24)

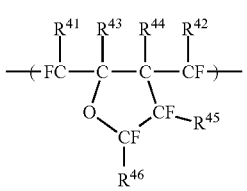
(u24)

$R^{41}$ to $R^{46}$ are each independently a monovalent perfluoro organic group which may have an etheric oxygen atom, or a fluorine atom. As the monovalent perfluoro organic group, a perfluoroalkyl group is preferred. In a case where the perfluoroalkyl group has an etheric oxygen atom, the number of oxygen atoms may be one, or two or more. Further, the oxygen atom may be inserted between the carbon-carbon atoms of the perfluoroalkyl group, or may be inserted at a terminal of the carbon atom bond. The perfluoroalkyl group may be linear or branched, and is preferably linear.

From the viewpoint of high polymerization reactivity, $R^{41}$ to $R^{44}$ are more preferably fluorine atoms.

As specific examples of the compound (m24), compounds (m24-1) to (m24-3) may be mentioned, and from the viewpoint of easy synthesis of the monomer, the compound (m24-1) is preferred.

$$CF_2=CF-O-CF_2-CF_2-CF=CF_2 \quad (m24-1)$$

$$CF_2=CF-O-CF_2-CF(CF_3)-CF=CF_2 \quad (m24-2)$$

$$CF_2=CF-O-CF(CF_3)-CF_2-CF=CF_2 \quad (m24-3)$$

The compound (m24) can be synthesized by the method described in Macromol. Symp., Vol. 98, 1995, p. 753-767, etc.

Units (C) are units based on a monomer (hereinafter referred to as a monomer (c)) other than the monomer (a) and the monomer (b).

Specific examples of the monomer (c) may be TFE, chlorotrifluoroethylene, trifluoroethylene, vinylidene fluoride, vinyl fluoride, ethylene, propylene, a perfluoro α-olefin (hexafluoropropylene, etc.), a (perfluoroalkyl)ethylene ((perfluorobutyl)ethylene etc.), a (perfluoroalkyl)propene (3-perfluorooctyl-1-propene etc.), and a perfluoro(alkyl vinyl ether). As the monomer (c), TFE is preferred.

The content of units (A) in the polymer (F) is preferably such a content that the ion exchange capacity of the polymer (H) becomes to be from 1.10 to 2.00 meq/g dry resin. The content of units (A) to bring about such an ion exchange capacity, is preferably from 8 to 19 mol %, more preferably from 13 to 18 mol %, to all units of the polymer (F).

The content of units (B) in the polymer (F) is preferably from 30 to 80 mol %, more preferably from 65 to 80 mol %, to all units of the polymer (F).

The content of units (C) in the polymer (F) is preferably from 0 to 62 mol %, more preferably from 0 to 20 mol %, to all units of the polymer (F).

In a case where units (C) are TFE units, the content of TFE units in the polymer (F) is preferably from 0 to 62 mol %, more preferably from 1 to 27 mol %, to all units of the polymer (F).

The density of the polymer (F) is preferably at most 2.03 g/cm³, more preferably from 1.80 to 2.00 g/cm³, further preferably from 1.85 to 1.97 g/cm³.

As the method of adjusting the density of the polymer (F) to be at most 2.03 g/cm³, a method of increasing the proportion of units (B) in the polymer (F) may be mentioned.

The method for calculating the density of the polymer (F) will be described in detail in the section for Examples given later.

The polymer (F) can be produced by polymerizing the monomer (a), the monomer (b) and optionally the monomer (c).

As the polymerization method, the method described in WO2011/013578 may be mentioned.

The polymer (H) is a polymer having units (hereinafter referred to as units (A')) having ion exchange groups, units (B) and optionally units (C), and corresponds to a polymer having precursor groups of the polymer (F) converted to ion exchange groups.

Units (A') are units formed by converting precursor groups of units (A) to ion exchange groups.

As the ion exchange group, a group (g'1) derived from the group (g1) is preferred.

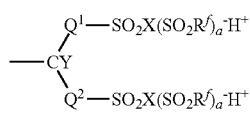

$Q^1$, $Q^2$ and Y are as described for the group (g1).

$R^f$ is a linear or branched perfluoroalkyl group which may have an etheric oxygen atom. The number of carbon atoms in the perfluoroalkyl group is preferably from 1 to 8, more preferably from 1 to 6. In a case where the group (g'1) has two or more $R^f$, the respective $R^f$ may be the same group or different groups.

X is an oxygen atom, a nitrogen atom or a carbon atom, and a=0 when X is an oxygen atom, a=1 when X is a nitrogen atom, and a=2 when X is a carbon atom.

The group (g'1) may be a sulfonic acid group (—SO₃⁻H⁺ group), a sulfonimide group (—SO₂N(SO₂R^f)⁻H⁺ group), or a sulfonmethide group ((—SO₂C(SO₂R^f)₂)⁻H⁺ group).

As unit (A'), a unit (u1) derived from a unit based on the compound (m1) is preferred.

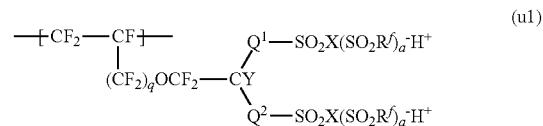

$Q^1$, $Q^2$ and Y are as described for the group (g1).
q is as described for the compound (m1).
$R^f$, X and a are as described for the group (g'1).

As the unit (u1), from such a viewpoint that production of the polymer (H) will be easy and industrially implementation will be easy, units (u1-1) to (u1-3) are preferred, and the unit (u1-1) is more preferred.

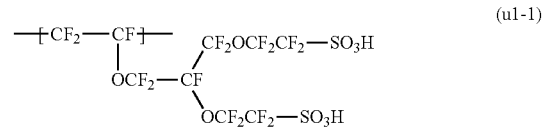

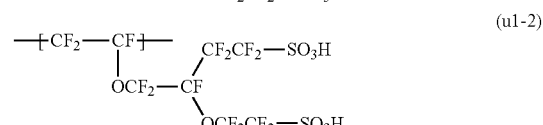

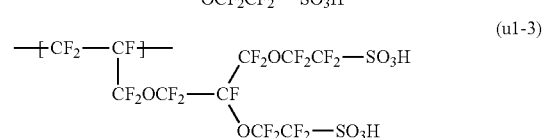

The ion exchange capacity of the polymer having ion exchange groups is preferably from 1.10 to 2.00 meq/g dry resin, more preferably from 1.10 to 1.60 meq/g dry resin.

In a case where the polymer having ion exchange groups is the polymer (H), in order to adjust the ion exchange capacity of the polymer (H), the proportion of the monomer (a) at the time of synthesizing the polymer (F) is adjusted.

A polymer having ion exchange groups can be produced by converting precursor groups of a polymer having the precursor groups which become to be ion exchange groups, to ion exchange groups. In a case where the polymer having ion exchange groups is the polymer (H), the polymer (H) can be produced by converting the precursor groups of the polymer (F) to ion exchange groups.

As the method for converting precursor groups to ion exchange groups, the method described in WO2011/013578 may be mentioned. For example, as a method for converting —SO₂F groups to sulfonic acid groups (—SO₃⁻H⁺ groups), a method of hydrolyzing —SO₂F groups in the polymer (F) to sulfonate groups and converting sulfonate groups to an acid form into sulfonic acid groups.

(Solvent)

Specific examples of the solvent may be water and an organic solvent. The liquid composition may contain both water and an organic solvent.

As the organic solvent, at least one type of $C_{1-4}$ alcohols is preferred.

Specific examples of the $C_{1-4}$ alcohols may be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, 3,3,3-trifluoro-1-propanol, 2-butanol, 2-methyl-1-propanol and 2-methyl-2-propanol.

In a case where the liquid composition contains both water and an organic solvent, the proportion of water is preferably from 10 to 60 mass %, more preferably from 10 to 40 mass %, to the total amount of water and the organic solvent.

When the proportion of water and the organic solvent is within the above range, the dispersibility of the polymer having ion exchange groups in the solvent will be excellent.

The concentration of the polymer having ion exchange groups in the liquid composition is preferably from 10 to 26 mass %, more preferably from 10 to 24 mass %.

When the concentration of the polymer having ion exchange groups is at least the lower limit value in the above range, it will be easy to prepare the liquid composition. When the concentration of the polymer having ion exchange groups is at most the upper limit value in the above range, the fluidity of the liquid composition will be good.

(Method for Producing Liquid Composition)

As an example of the method for producing the liquid composition, a method having steps (1) to (3) may be mentioned.

Step (1): A step of preparing a mixed liquid which is a mixed liquid comprising a polymer having ion exchange groups, water and an organic solvent, wherein the concentration of the polymer having ion exchange groups is from 12 to 30 mass %, and the proportion of water is from 10 to 40 mass % to the total amount of water and the organic solvent.

Step (2): A step of stirring the mixed liquid at a shear rate of at least 50 $s^{-1}$ while heating the mixed liquid to from 100 to 150° C., to increase the viscosity of the mixed liquid, and then continuing the stirring until the viscosity of the mixed liquid is lowered and stabilized, to obtain a liquid composition.

Step (3): A step of adding a dispersion medium to the liquid composition as the case requires, to adjust the concentration of the polymer having ion exchange groups to be from 10 to 26 mass %.

The concentration of the polymer having ion exchange groups in the mixed liquid in step (1) is from 12 to 30 mass %, preferably from 16 to 28 mass %. When the concentration of the polymer having ion exchange groups is within the above range, there will be little undissolved residue, and a liquid composition having high dispersibility will be easily obtainable.

The proportion of water in the mixed liquid in step (1) is from 10 to 40 mass %, preferably from 10 to 30 mass %, to the total amount of water and the organic solvent.

When the proportion of water is within the above range, there will be little undissolved residue, and a liquid composition having high dispersibility will be easily obtainable.

In step (2), the temperature of the mixed liquid at the time of stirring is from 100 to 150° C., more preferably from 105 to 125° C. When the temperature of the mixed liquid is within the above range, there will be little undissolved residue, and a liquid composition having high dispersibility will be easily obtainable.

The shear rate at the time of stirring is at least 50 $s^{-1}$, preferably from 50 to 1,000 $s^{-1}$, more preferably from 50 to 500 $s^{-1}$. When the shear rate is within the above range, there will be little undissolved residue, and a liquid composition having high dispersibility will be easily obtainable.

In step (3), the additional solvent contains at least one of water and an organic solvent.

The additional amount of the dispersion medium may be such that the proportion of water and the organic solvent in the finally obtainable liquid composition will be within the above-mentioned preferred range.

The liquid composition of the present invention may be suitably used for forming a catalyst layer or a solid polymer electrolyte membrane in a membrane electrode assembly. Further, it may be used for forming other membranes (a proton selective permeation membrane to be used for water electrolysis, hydrogen peroxide production, ozone production, waste acid recovery, etc., a cation exchange membrane for salt electrolysis, a diaphragm for a redox flow battery, a cation exchange membrane for electrodialysis to be used for desalination or salt production, etc.).

Examples

In the following, the present invention will be described in more detail with reference to Examples and Comparative Examples, but the present invention is not limited thereto.

(Density)

The density of the polymer (F) was obtained by using an electronic hydrometer (MD-300S, manufactured by Alpha Mirage Co., Ltd.) utilizing an underwater substitution method. Specifically, after measuring the mass of the polymer (F) in air, the polymer (F) was immersed in water at 20° C. to measure the mass. From these masses, the specific gravity in water at 20° C. was obtained and further converted to the specific gravity in water at 4° C. to obtain the density.

(Ion Exchange Capacity)

The polymer (H) was placed in a glove box and left to stand in an atmosphere of flowing dry nitrogen for at least 24 hours to be dried. The dry mass of the polymer (H) was measured in the glove box.

The polymer (H) was immersed in a 2 mol/L sodium chloride aqueous solution, left to stand at 60° C. for 1 hour, and then cooled to room temperature. The sodium chloride aqueous solution in which the polymer (H) was immersed was titrated with a 0.5 mol/L sodium hydroxide aqueous solution to obtain the ion exchange capacity of the polymer (H).

(Average Tan δ1, Average Tan δ2)

Using a rheometer (manufactured by Anton-Paar, MCR301), a hood type Peltier element temperature control system and a parallel plate PP25 were arranged, and the liquid composition was set so that the gap became 0.5 mm. In order to prevent evaporation of the solvent in the liquid composition, a sponge containing a liquid with the same solvent composition as the liquid composition was disposed in the hood, and the periphery of the liquid composition was covered with silicone oil having a sufficiently lower viscosity than the liquid composition, whereupon the liquid composition was warmed to a temperature of T1. Next, the dynamic viscoelasticity measurement was carried out while changing the frequency from 1 Hz to 100 Hz by setting the strain to be 1%. That is, by fixing the temperature at T1 (° C.) and the strain at 1% and by changing the frequency, the dynamic viscoelasticity measurement was carried out, and the frequency dependence of the liquid composition was measured.

At that time, the frequency was measured from 1 Hz to 100 Hz at 21 points so that the intervals were evenly spaced when a logarithmic scale was used, whereby the loss tangent tan δ (10 Hz) at the frequency 10 Hz and the loss tangent tan δ (20 Hz) at the frequency 20 Hz were obtained, and they were arithmetically averaged to calculate an average tan δ1.

Here, the temperature T1 represents the temperature of the liquid composition discharged from the discharge port 54c of the filling nozzle 18, as described later.

Further, the average tan δ2 was calculated in the same procedure as the above average tan δ1 except that the temperature T1 was changed to T2. Here, the temperature T2 represents the temperature of the liquid composition passing through the storage tank 12, the filter 16 and the transport pipe 26, as described later.

In the following, compounds to be used in Synthesis Examples will be shown.

(Compound (m1-1))

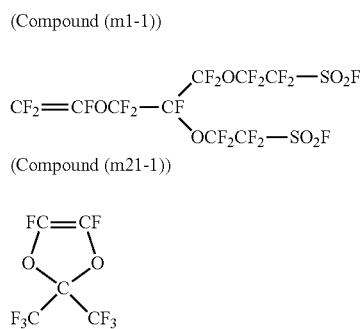

(m1-1)

(Compound (m21-1))

(m21-1)

Compound (m1-1) was synthesized in accordance with the method as described in Example 1 of JP-A-2008-202039.

(Radical Initiator)

  Compound (i-1):

(Solvent)

  Compound (s-1):

Synthesis Example 1

A polymer (H-1) was produced in accordance with the description in paragraph 0114 of WO2017/006841. The ion exchange capacity of the polymer (H-1) was measured. The results are shown in Table 1.

Synthesis Example 2

A polymer (H-2) was produced in the same manner as the polymer (H-1) except that the charged amounts of the respective monomers were changed so that the proportions of the respective units became to be the proportions as shown in Table 1. The results are shown in Table 1.

In Table 1, "units (mol %)" represents the contents (mol %) of the respective units to all units in the polymer.

TABLE 1

| Polymer | Units (mol %) | | | Density | Polymer | Ion exchange capacity |
|---|---|---|---|---|---|---|
| (F) | (m21-1) | (m1-1) | TFE | (g/cm³) | (H) | (meq/g dry resin) |
| (F-1) | 67 | 17 | 16 | 1.99 | (H-1) | 1.19 |
| (F-2) | 68 | 18 | 14 | 1.98 | (H-2) | 1.21 |

Preparation Example 1

A mixed solution of 1-propanol and water (mass ratio: 1-propanol/water=65/35) was added to the polymer (H-1) to obtain a mixed liquid having the solid content concentration made to be 23 mass %.

Using an autoclave, the above mixed liquid was stirred at a temperature of 115° C. at a shear rate of 390 s$^{-1}$. After 8 hours from initiation of the stirring, 1-propanol was added to the above mixed solution to adjust the solid content concentration to be 16.7%, to obtain a liquid composition 1 in which the polymer (H-1) was dispersed in a dispersion medium.

Preparation Example 2

A liquid composition 2 was obtained in accordance with the same procedure as in (Preparation Example 1) except that the polymer (H-2) was used instead of the polymer (H-1), and the solid content concentration was changed from 16.7% to 16.5%.

Example 1

The fractionation apparatus as shown in FIG. 1 was prepared, and the liquid composition 1 was added into the storage tank 12.

Next, by supplying nitrogen from the pressure source 14, the liquid composition 1 was discharged from the storage tank 12 to the transport pipe 26, the liquid composition 1 was transported to the filling nozzle 18, and further, from the discharge port 54c of the filling nozzle 18, the liquid composition 1 was discharged, so that the liquid composition 1 was filled into the bottle B.

Here, the storage tank 12, the filter 16 and the transport pipe 26 were heated by temperature adjusting means installed respectively, whereby the heating temperature was adjusted so the temperature of the liquid composition 1 passing through the storage tank 12, the filter 16 and the transport pipe 26 became to be 80° C.

Further, the filling nozzle 18 was also heated by an installed temperature adjusting means, whereby the heating temperature was adjusted so that the temperature of the liquid composition 1 in the filling nozzle 18 became to be 75° C. In other words, the temperature of the liquid composition 1 discharged from the discharge port 54c of the filling nozzle 18 was 75° C.

Here, the storage tank 12 was heated by supplying a temperature control medium to the jacket, and the transport pipe 26, the filter 16, and the filling nozzle 18 were heated by ribbon heaters.

At the time when the filling amount of the liquid composition 1 into the bottle B by the weighing table 20 reached 2,000 g, the shaft member 56 was lowered to close the filling nozzle 18.

After the filling of the liquid composition into the bottle B by dropping the liquid composition 1 from the filling nozzle 18, was completed, the next bottle B was mounted at a predetermined position on the weighing table 20, and the shaft member 56 was raised to open the filling nozzle 18, and the filling of the liquid composition 1 into the next bottle B was started. At the time when the filling amount of the liquid composition 1 into the bottle B by the weighing table 20 reached 2,000 g, the shaft member 56 was lowered to close the filling nozzle 18. This operation was repeated 5 times to prepare 5 bottles B filled with the liquid composition 1, and the average filling amount obtained by arithmetically averaging the filling amounts of the respective bottles B, and the filling amount standard deviation were obtained.

Further, the times until the liquid composition 1 was filled in the respective bottles B were measured, whereupon the average filling speed (min/bottle) obtainable by arithmetically averaging them was obtained.

The results are summarized in Table 2.

Further, in the filling nozzle 18 used above, the distance t between the discharge port 54c (the tip of the filling nozzle) and the closed portion, as shown in FIG. 3, was 2 mm.

Examples 2 to 5, Comparative Example 1

Filling of the liquid composition was carried out in accordance with the same procedure as in Example 1 except that the type of liquid composition to be used, the temperature of the liquid composition passing through the storage tank 12, the filter 16 and the transport pipe 26, and the temperature of the liquid composition in the filling nozzle 18 were changed.

The results are summarized in Table 2.
(Evaluation of Separability)

In each Example and Comparative Example, when the filling nozzle was closed, whether or not liquid dripping of the liquid composition remained at the tip of the filling nozzle, was visually observed. The case where there was no liquid dripping was evaluated as "○" (good), and the case where there was liquid dripping was evaluated as "x" (no good).

In Table 2, "T1 (° C.)" represents the temperature of the liquid composition discharged from the discharge port 54c of the filling nozzle 18. "Average tan δ1" represents the average tan δ1 of the liquid composition at "T1 (° C.)". "T2 (° C.)" represents the temperature of the liquid composition passing through the storage tank 12, the filter 16, and the transportation pipe 26. "Average tan δ2" represents the average tan δ2 of the liquid composition at "T2 (° C.)".

TABLE 2

|  | Type of liquid composition | T2 (° C.) | Average tan δ2 | T1 (° C.) | Average tan δ1 | Evaluation | | | |
|---|---|---|---|---|---|---|---|---|---|
|  |  |  |  |  |  | Average filling speed (min/bottle) | Average filling amount (g) | Filling amount standard deviation | Separability |
| Example 1 | 1 | 80 | 1.13 | 75 | 0.72 | 3 | 2004 | 2.7 | ○ |
| Example 2 | 1 | 80 | 1.13 | 70 | 0.63 | 3.3 | 2002 | 2.8 | ○ |
| Example 3 | 2 | 80 | 2.92 | 75 | 0.76 | 0.7 | 2001 | 2.1 | ○ |
| Example 4 | 1 | 75 | 0.72 | 75 | 0.72 | 12 | 2002 | 2.8 | ○ |
| Example 5 | 1 | 70 | 0.63 | 75 | 0.72 | 30 | 2004 | 2.5 | ○ |
| Comparative Example 1 | 1 | 80 | 1.13 | 80 | 1.13 | 3 | 2020 | 20.6 | x |

As shown in Table 2, according to the fractionation method of the present invention, the liquid composition was excellent in separability. Further, when the average tan δ2 was within the predetermined range, the average filling speed was short, and it was possible to fractionate the liquid composition in a short time.

This application is a continuation of PCT Application No. PCT/JP2019/015672, filed on Apr. 10, 2019, which is based upon and claims the benefit of priority from Japanese Patent Application No. 2018-076951 filed on Apr. 12, 2018. The contents of those applications are incorporated herein by reference in their entireties.

REFERENCE SYMBOLS

10: Fractionating apparatus, 12: storage tank, 14: pressure source, 16: filter, 18: filling nozzle, 20: weighing table, 20a: leg portion, 24: elevating means, 26: transport pipe, 30 and 38: valves, 32 and 40: pressure gauge, 36: pressure pipe, 46: support column, 48: beam, 54: nozzle body, 54a: inlet port, 54b: nozzle portion, 54c: discharge port, 54d: holding portion, 56: shaft member, 56a: large diameter portion, 56b: small diameter portion, 56c: engaging portion, 60: packing

What is claimed is:

1. A method for fractionating a liquid composition, which comprises discharging a liquid composition containing a polymer having ion exchange groups and a solvent, from a discharge port of a filling nozzle, and fractionating a predetermined amount of the liquid composition,
   characterized in that the temperature of the liquid composition is controlled so that an average tan δ1 of the liquid composition when discharged from the discharge port becomes to be at most 1.00,
   wherein the average tan δ1 means an arithmetic mean value of the loss tangent tan δ (10 Hz) at a frequency of 10 Hz and the loss tangent tan δ (20 Hz) at a frequency of 20 Hz, which are obtained by dynamic viscoelasticity measurement conducted by changing the frequency from 1 Hz to 100 Hz under conditions of a strain of 1% and a temperature of T1 using the liquid composition, at the time when the temperature of the liquid composition discharged from the discharge port of the filling nozzle is set to be T1.

2. The method for fractionating a liquid composition according to claim 1, wherein the liquid composition is supplied from a reservoir of the liquid composition to the filling nozzle via a transfer channel, and the temperature of the liquid composition is controlled so that an average tan δ2 of the liquid composition becomes to exceed 1.00 in a region of at least a part in the transfer channel,
   wherein the average tan δ2 means an arithmetic mean value of the loss tangent tan δ (10 Hz) at a frequency of 10 Hz and the loss tangent tan δ (20 Hz) at a frequency of 20 Hz, which are obtained by dynamic viscoelasticity measurement conducted by changing the frequency from 1 Hz to 100 Hz under conditions of a strain of 1% and a temperature of T2 using the liquid composition, at the time when the temperature of the liquid composition in the region of at least a part in the transfer channel is set to be T2.

3. The fractionation method according to claim 2, wherein a filter is disposed in a portion of the transfer channel, and the temperature of the liquid composition is controlled so that the average tan δ2 of the liquid composition becomes to exceed 1.00 from the reservoir to at least downstream of the filter.

4. The fractionation method according to claim 2, wherein the liquid composition is supplied from the reservoir of the liquid composition to the filling nozzle via the transfer channel, and the temperature of the liquid composition in the region of at least a part in the transfer channel is controlled to be more than 75° C. and at most 100° C.

5. The fractionation method according to claim 2, wherein the average tan δ2 of the liquid composition is from 1.01 to 10.00.

6. The fractionation method according to claim 1, wherein the filling nozzle has a closing mechanism that can close and open the discharge port by moving a forward and backward movable pressing member, and at the time when the pressing member closes the discharge port, the distance between an abutting portion of the pressing member with an inner wall of the filling nozzle and a tip portion of the filling nozzle is at most 5 mm.

7. The fractionation method according to claim 1, wherein the temperature of the liquid composition at the time when discharged from the discharge port of the filling nozzle is controlled to be from 40 to 75° C.

8. The fractionation method according to claim 1, wherein the average tan δ1 of the liquid composition is from 0.20 to 0.90.

9. The fractionation method according to claim 1, wherein the polymer having ion exchange groups is a perfluoropolymer having ion exchange groups.

10. The fractionation method according to claim 9, wherein the perfluoropolymer having ion exchange groups is a polymer (F) which is a polymer having units (A) based on a perfluoromonomer having a precursor group capable of being converted to an ion exchange group, and units (B) based on a perfluoromonoene monomer having a 5-membered ring, or a perfluorodiene monomer capable of forming a 5-membered ring by cyclopolymerization, which the precursor group capable of being converted to an ion exchange group has been converted to an ion exchange group.

11. The fractionation method according to claim 10, wherein units (A) are units based on a perfluoromonomer having a precursor group represented by the following formula (g1):

$Q^1$ is a perfluoroalkylene group which may have an etheric oxygen atom,
$Q^2$ is a single bond or a perfluoroalkylene group which may have an etheric oxygen atom, and Y is a fluorine atom or a monovalent perfluoro organic group.

12. The fractionation method according to claim 10, wherein the content of units (A) in the polymer (F) is from 8 to 19 mol %, to all units of the polymer (F).

13. The fractionation method according to claim 9, wherein the content of the perfluoropolymer having ion exchange groups contained in the liquid composition is from 10 to 26 mass %.

14. The fractionation method according to claim 1, wherein the solvent contained in the liquid composition contains one or both of water and an organic solvent, and in the case of containing both, the proportion of water is from 1 to 60 mass % to the total amount of water and the organic solvent.

* * * * *